United States Patent Office
3,446,069
Patented May 27, 1969

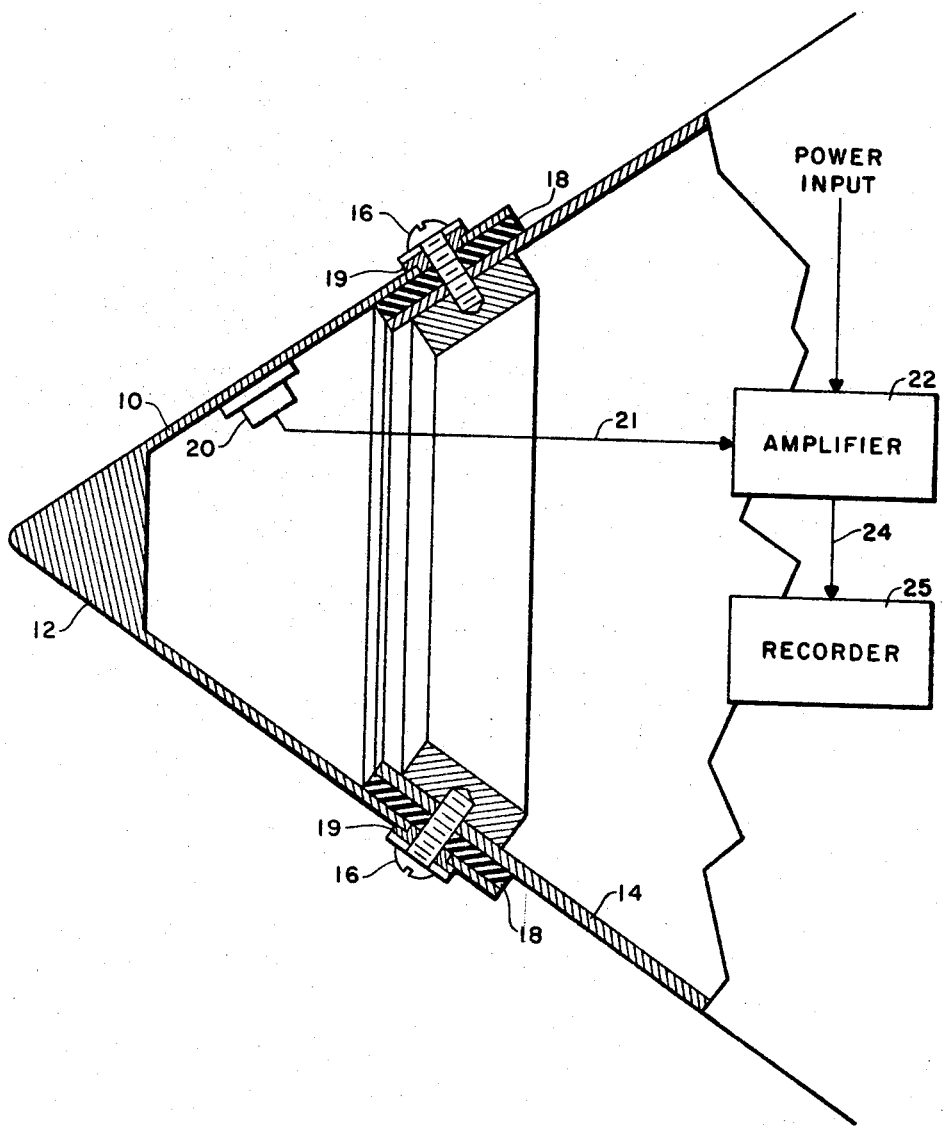

3,446,069
RAIN GAUGE FOR AIRBORNE VEHICLE
Robert D. Zink, Corona, Calif., assignor to the United States of America as represented by the Secretary of the Navy
Filed July 31, 1967, Ser. No. 657,741
Int. Cl. G01w 1/14
U.S. Cl. 73—171    3 Claims

ABSTRACT OF THE DISCLOSURE

A nose-cone rain gauge for airborne vehicles such as aircraft and the like having an accelerometer-detector mounted therein for detecting momentum transferred from impinging raindrops, determining the exact time of entering and leaving a rain area, indicating changes in rain rate, and recording such information.

---

The invention herein described may be manufactured and used by or for the Government of the United States of America for governmental purposes without the payment of any royalties thereon or therefor.

Radar has been used for finding an approximate rain rate near aircraft, but this and other prior methods only show average rate over a large volume, such as a cubic mile.

The present system is for determining within milliseconds the exact time of changes in rain rate at the nose of an aircraft and when aircraft enters and leaves a rain area. The information obtained from this rain gauge can be used, for example, in determining effects of rain on communications and communications equipment as well as aircraft turbulence.

The figure of drawing shows a diagrammatic view of an embodiment of the invention.

As shown in the drawing, a cone 10, of aluminum for example, having a solid tip 12, is mounted at the nose of an airborne vehicle 14. The cone may be attached to the aircraft by any suitable fastening means such as bolts 16, and conductively insulated from the aircraft by means of a large spacer washer 18 and insert washers 19 of silicon rubber, nylon or the like. Spacer washer 18 also acts to help vibrationally isolate cone 10 from vehicle 14 and eliminate resonances. A detector 20, such as an accelerometer crystal detector is mounted on the cone wall midway between the apex and base of the cone and its output fed via cable 21 to amplifier 22. The output of amplifier 22 can then be fed through a standard coaxial cable to a recording instrument 25. The detector and amplifier are standard components matched to each other for gain and linearity purposes. A cone-shaped drumhead is used as a preferred design for rigidity and aerodynamic purposes. The cone size used can be varied to obtain the most suitable surface area giving some control over the number of rain drops per unit of time that will impinge on the gauge. Good results have been obtained with a six inch diameter cone of aluminum having .032 inch wall thickness. If too large a surface area is used, low level noise due to vehicle vibration might be detected and in heavy rain there may be an overlap in drop impingement resulting in missing drop detection due to time overlap. The stiffness of the wall of the cone can also be controlled through change of materials or wall thickness or both. Cable 21 is shielded.

In operation, a falling raindrop hits cone 10 and transfers its momentum to the cone. The airstream going by the cone removes the water of the drop allowing the next drop hitting the same spot to register equally as well. The momentum transferred from the drop to the cone excites resonances in the material of the cone and the system acts, with each drop impingement, like a small hammer pounding on a kettledrum. Due to construction of the cone, any resonances excited are damped in a matter of a few hundreths of a millisecond, thus reducing complexities in signals from two or more drops hitting almost simultaneously. The motion of the cone material at the point where detector 20 is mounted is converted by the detector to a change of capacitance whose amplitude is proportional to acceleration at the frequency of deflection. Amplifier 22 converts this to a voltage whose frequency and amplitude are directly proportional to the capacitance change. This signal voltage is then fed to recorder 25, such as a magnetic tape recorder having frequency response of 100 Hz. to 100 kHz. The recorded data can later be transferred to visual records for analysis if desired. Alternatively a voltmeter may be used to show signal enevlope amplitude or a galvanometer-type recorder may be used to make a permanent record of the signal envelope amplitude.

Obviously many modifications and variations of the present invention are possible in the light of the above teachings. It is therefore to be understood that within the scope of the appended claims the invention may be practiced otherwise than as specifically described.

What is claimed is:
1. In an airborne vehicle, a rain gauge for determining the exact time of entering and leaving a rain area and for indicating changes in rain rate, comprising:
   (a) a cone-shaped drumhead,
   (b) a detector means mounted on wall of said cone for detecting the momentum and rapidity of impinging raindrops,
   (c) amplifier and recording means connected to said detector means for recording the signal output of said detector which is proportional to acceleration and frequency.
2. A device as in claim 1 wherein said cone is substantially vibrationally isolated from the airborne vehicle by spacer means.
3. A device as in claim 2 wherein said cone shaped drumhead damps any resonances excited in a few hundreths of a millisecond.

References Cited
UNITED STATES PATENTS
3,309,474    3/1967    Heinrich _____ 73—171

JAMES J. GILL, Primary Examiner.
JERRY W. MYRACLE, Assistant Examiner.

U.S. Cl. X.R.
73—514; 340—235